United States Patent [19]
Mayzes

[11] Patent Number: 5,315,917
[45] Date of Patent: May 31, 1994

[54] MONOPORT AIRGUN FOR SEISMIC EXPLORATION HAVING DISCHARGE PORT EXTENDING CONTINUOUSLY FOR 360 DEGREE AROUND ITS AXIS

[76] Inventor: Edward W. Mayzes, 48 White Ave., Bragg Creek, Alberta, Canada, T0L 0K0

[21] Appl. No.: 973,765

[22] Filed: Nov. 9, 1992

[30] Foreign Application Priority Data

Nov. 13, 1991 [CA] Canada .................................. 2055405

[51] Int. Cl.$^5$ ........................ F15B 11/08; H04R 23/00
[52] U.S. Cl. .................................... 91/418; 367/144; 367/120
[58] Field of Search ............... 91/418, 419, 442, 454, 91/459; 92/109, 113, 115; 124/56, 70, 71, 73, 77; 367/142, 144; 181/119, 120

[56] References Cited
U.S. PATENT DOCUMENTS

| | | | |
|---|---|---|---|
| 3,131,646 | 5/1964 | Parrott | 124/73 |
| 4,049,078 | 9/1977 | Paitson et al. | 367/144 X |
| 4,230,201 | 10/1980 | Bays | 367/144 X |
| 4,246,979 | 1/1981 | Thomson et al. | 367/144 X |
| 4,774,696 | 9/1988 | Otto | 367/144 |
| 4,825,973 | 5/1989 | Harrison | 367/144 X |
| 4,852,071 | 7/1989 | Otto | 367/144 |
| 5,142,509 | 8/1992 | Dolengowski | 367/144 |

*Primary Examiner*—Edward K. Look
*Assistant Examiner*—Hoang Nguyen
*Attorney, Agent, or Firm*—Schlesinger, Arkwright & Garvey

[57] ABSTRACT

A monoport airgun for seismic exploration has a single discharge port extending continuously for 360° around its longitudinal axis. This airgun has a first housing providing a firing chamber containing pressurized gaseous fluid (gas) and a second housing providing an operating chamber. The first and second housings are positioned in alignment along the longitudinal axis. They are spaced apart along this axis for defining the discharge port between them extending continuously around the axis. The two housings of the monoport airgun are interconnected solely by a guide member concentric with the axis. A shuttle encircling the guide member is movable therealong between closed and open positions. In closed position, the shuttle closes the firing chamber for retaining pressurized gas therein. In open position, the shuttle opens the firing chamber to the discharge port for allowing pressurized gas to blast from the firing chamber through the discharge port. The discharge port which extends continuously around the axis flares outwardly in generally exponential horn-like configuration for enhancing effectiveness of the discharge port in generating seismic energy waves. A passageway in the guide member supplies pressurized gas from the operating chamber to the firing chamber when the shuttle is in closed position. This passageway is blocked by the shuttle in open position.

18 Claims, 8 Drawing Sheets

MONOPORT AIRGUN FOR SEISMIC EXPLORATION HAVING DISCHARGE PORT EXTENDING CONTINUOUSLY FOR 360 DEGREE AROUND ITS AXIS

FIELD OF THE INVENTION

This invention relates to an impulsive energy source for seismic exploration. More particularly, the invention relates to a monoport airgun having a discharge port extending continuously for 360° around a longitudinal axis of the airgun. This single 360° discharge port is arranged to provide a more symmetrical discharge than occurs from a multi-port airgun and also a more symmetrical discharge than from a multi-throat airgun. In a preferred embodiment, this discharge port flares outwardly in a generally exponential horn-like configuration for enhancing effectiveness o this discharge port in generating seismic energy waves by expanding gaseous fluid blasting outwardly through this discharge port in contact with a surrounding water medium. The outwardly flaring horn-like configuration of this discharge port is provided for enhancing dynamic coupling between pressurized gas being discharged from the discharge port and an ambient water medium surrounding the airgun.

BACKGROUND

Airguns are used for seismic exploration. They are impulsive energy sources which are triggered to discharge a powerful blast of pressurized gaseous fluid from the airgun. This pressurized gaseous fluid usually is compressed air. However, other pressurized gaseous fluids can be used. Thus, the term "pressurized gaseous fluid" as used herein is intended to include a pressurized gas and a pressurized mixture of gases, for example, compressed air, compressed Nitrogen, compressed Carbon Dioxide, and compressed gaseous products of combustion.

The surrounding ambient "water medium" as described herein is intended to include salt water, fresh water, water-filled muddy areas and watery marsh or swamp areas. The powerful blast of pressurized gaseous fluid issuing from the airgun through the discharge port suddenly transfers energy into such a surrounding water medium for generating seismic energy waves which are propagated into the Earth for providing seismic exploration data.

To achieve deep penetration of seismic energy into the Earth and to provide more definitive seismic data, it is desirable to maximize the transfer of energy from the blast of gaseous fluid into the surrounding water medium and also desirable to maximize peak pressure of an initial pressure pulse generated by this blast relative to peak pressure of any secondary pressure pulse created in the water medium subsequent to the initial peak pressure pulse.

SUMMARY

In accordance with the present invention in a preferred embodiment there is provided a monoport airgun for seismic exploration. This monoport airgun has a single discharge port extending continuously for 360° around its longitudinal axis for maximizing the discharge rate of pressure gaseous fluid out through the discharge port into a surrounding water medium.

Moreover, this discharge port is shown as being flared outwardly in a generally exponential horn-like configuration for enhancing dynamic coupling between the outwardly blasting, expanding gaseous fluid and the surrounding water medium and hence for enhancing the generation of seismic energy waves in the water medium by this outwardly blasting gaseous fluid expanding against the surrounding water medium. Pressurized gaseous fluid, for example, compressed air, at a suitable pressure for charging an airgun, such as a pressure in the range from about 1,500 pounds per square inch (psi) to about 3,000 psi is contained in the firing chamber prior to firing of the airgun. When the airgun is triggered into its firing mode, the pressurized gaseous fluid suddenly is allowed to expand out of the firing chamber and this expanding gaseous fluid blasts outwardly in all radial directions through the discharge port extending continuously around the longitudinal axis of the airgun. This outwardly blasting, expanding gaseous fluid has a relatively low range of densities (relatively low range of mass per unit volume). Moreover, this outwardly blasting, expanding gaseous fluid is experiencing a reduction in its density while it is pushing outwardly against the surrounding ambient water medium. This water medium, for example, such as in a body of salt water is relatively much more dense and is relatively incompressible (relatively non-compressible) as compared with the outwardly blasting, expanding gaseous fluid. In other words, an energy transfer is occurring between a relatively low density expanding gaseous fluid and a relatively high density, relatively incompressible water medium. The outwardly flaring horn-like configuration of the discharge port which extends continuously around the longitudinal axis of the airgun is designed for enhancing dynamic coupling between outwardly blasting, expanding gaseous fluid and the surrounding relatively dense water medium for enhancing the generation of seismic energy waves in the water medium by this outwardly blasting gaseous fluid expanding in contact with the surrounding water medium.

In accordance with the present invention, there is provided a monoport airgun for seismic exploration. This monoport airgun has a longitudinal axis and a first housing for providing a firing chamber and a second housing for providing an operating chamber. The first and second housings are positioned in alignment along the axis, and the first and second housings are spaced apart along the axis for providing a discharge port between these two housings. The discharge port extends continuously 360 degrees around the axis and having an outwardly flaring horn-like configuration with generally exponentially shaped sidewalls. The first and second housings are interconnected at the discharge port solely by shuttle guide means. A shuttle encircles the guide means and is slidably mounted on the guide means. This shuttle is movable along the guide means between closed and open positions. In the closed position, the shuttle closes the firing chamber for enabling pressurized gaseous fluid to be contained in the firing chamber. In the open position, the shuttle opens the firing chamber to the discharge port for allowing pressurized gaseous fluid to be discharged from the firing chamber outwardly through said discharge port extending continuously around the axis. The operating chamber is for moving the shuttle between the open position and the closed position.

The outwardly flaring horn-like configuration of the discharge port for enhances dynamic coupling between outwardly blasting, expanding gaseous fluid and the surrounding relatively dense and relatively incompressible gaseous fluid for enhancing the generation of seismic energy waves in the water medium by this outwardly blasting gaseous fluid expanding in contact with the surrounding water medium.

The discharge port which extends continuously around the axis of the airgun is configured with an outwardly flaring horn like configuration for enhancing effectiveness of this discharge port in generating seismic energy waves by expanding pressurized gaseous fluid blasting outwardly through this discharge port into a surrounding water medium.

Among features and advantages which I envision to be provided by monoport airguns embodying the present invention are the following:

1. One single discharge port opening extends for 360° around the axis of the monoport airgun.
2. There can be a one-piece shuttle for opening or closing the single discharge port.
3. There is a large and long bearing surface inside of the shuttle slidable along the axially extending guide surface.
4. The shuttle is centre mounted and is guided by a centre guide member.
5. This centre guide member holds the monoport airgun together.
6. The discharge port opening has an outwardly flaring generally exponential horn-like configuration.
7. A firing piston on the shuttle may have a cup-like shape so that this cup will close the single discharge port when the shuttle is in closed position for adapting monoport airguns for use in mud pits.
8. Momentarily during a firing sequence when the shuttle is in an open position, the shuttle shuts off the feed of pressurized gaseous fluid, for example compressed air, into the firing chamber by covering a supply hole for blocking a supply path into the firing chamber.
9. The monoport airgun can use a variety of removable and replaceable firing chambers of various sizes.
10. The overall concept of the monoport airgun having a firing chamber housing connected to an operating chamber housing solely by a centre shuttle guide can be used to make larger or smaller airguns as may be desired.
11. The single discharge port extending continuously for 360° around the longitudinal axis of the monoport airgun provides a symmetrical discharge blast pattern which may result in a more symmetrical discharge blast bubble than a multi-discharge-port airgun.
12. There is a single annular discharge throat extending 360° around the centre shuttle guide and communicating directly with the single 360° discharge port for providing a more symmetrical discharge blast pattern than occurs in any airgun of any prior design of which I am aware.
13. The single discharge throat communicating directly with the single discharge port has a circular annular configuration unlike the throat of sleeve guns which comprises four elongated chambers communicating with a single sleeve opening.
14. The outwardly flaring, horn-like configuration of the single 360° discharge port is intended for enhanced acoustic coupling between the suddenly released blast of expanding gaseous fluid and the surrounding water medium.
15. The outwardly flaring, horn-like configuration of the single 360° discharge port is intended for enhanced dynamic coupling between a suddenly released blast of expanding gaseous fluid and the surrounding water medium for achieving enhanced energy transfer from an expanding gaseous fluid into a relatively dense and relatively incompressible water medium.
16. The single 360° discharge port is intended for providing a desirable and repeatable pressure "signature" within a water medium, in other words for providing "signature stability" during repeated cycles of operation.
17. I believe and foresee that monoport airguns embodying the present invention will provide mechanical reliability, signature stability, ease of deployment, towing stability and will enable a lesser overall number of airguns to be deployed in towed arrays for seismic exploration for generating more seismic exploration data than is generated today in towed arrays having a greater overall number of airguns.

BRIEF DESCRIPTION OF THE DRAWINGS

The invention, together with further objects, features, advantages and aspects thereof will be more clearly understood from the following description considered in conjunction with the accompanying drawings which are not necessarily drawn to scale with the emphasis instead being placed upon clearly illustrating the principles of the invention. Like reference numerals indicate like parts throughout the different views.

FIG. 2 shows the shuttle in its initial closed position.

DETAILED DESCRIPTION OF PREFERRED EMBODIMENTS

Figure 1:
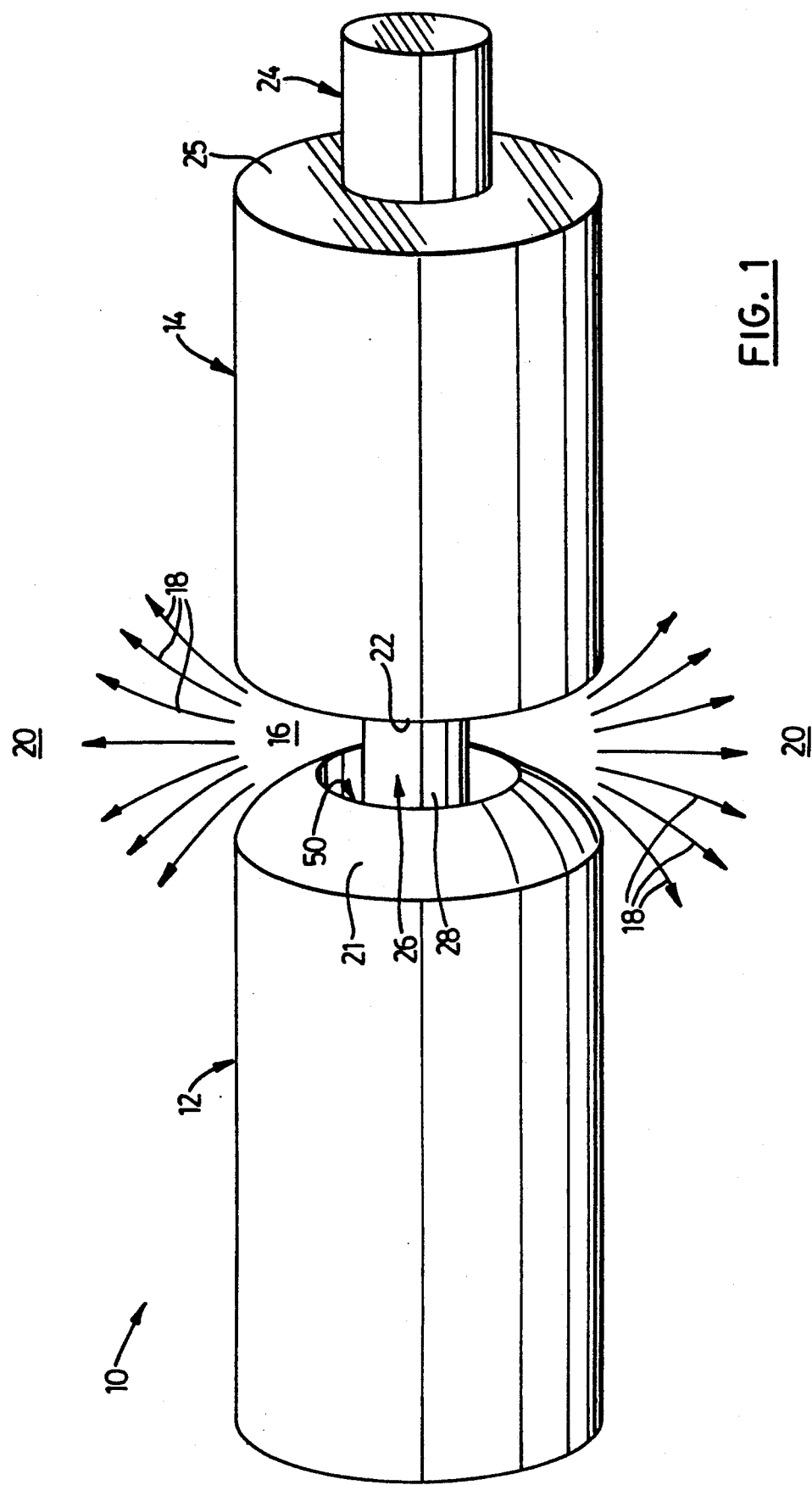
FIG. 1 is a perspective view of a monoport airgun embodying the present invention. This monoport airgun is shown in its firing mode. The arrows illustrate expanding pressurized gaseous fluid blasting outwardly through the discharge port which extends continuously around the longitudinal axis of the airgun. The outwardly flaring horn-like configuration of th discharge port is designed to enhance effectiveness of this discharge port in generating seismic energy waves by expanding pressurized gaseous fluid blasting outwardly through this discharge port into a surrounding water medium.

In FIG. 1 is shown a monoport airgun, generally indicated at 10, embodying the present invention. This monoport airgun includes a first housing 12 for providing a firing chamber therein and a second housing 14 for providing an operating chamber therein. The firing chamber and operating chamber will be described later in detail. The first and second housings 12 and 14 are positioned in axial alignment and are spaced apart along the longitudinal axis of the airgun 10 for providing a discharge port 16 between them. The airgun 10 in FIG. 1 is shown in the firing mode in which expanding pressurized gaseous fluid 18 is allowed to blast outwardly through the discharge port 16, as indicated by the arrows 18. This expanding pressurized gaseous fluid 18 is blasting outwardly from the port 16 into a surrounding water medium 20.

This discharge port 16 advantageously extends continuously for 360° around the axis of the airgun 10. Moreover, this discharge port 16 has an outwardly flaring, generally exponential, horn-like configuration as defined by its axially spaced, annular sidewalls 21 and 22 (see also FIGS. 2 and 3) which are facing toward each other. These annular sidewalls 21 and 22 of the discharge port 16 are defined by opposed end portions of the first and second housings 12 and 14. The purpose of this horn-like outwardly flared configuration 21, 22 of the discharge port 16 is to enhance dynamic coupling between the outwardly blasting, expanding gaseous fluid 18 and the surrounding water medium 20 and hence for enhancing the generation of seismic energy waves in the water medium 20 by this outwardly blasting gaseous fluid 18 expanding against the surrounding water medium. Pressurized gaseous fluid, for example, compressed air, at a suitable pressure for charging an airgun, such as a pressure in the range from about 1,500 pounds per square inch (psi) to about 3,000 psi is fed into the firing chamber within the housing 12 prior to firing of the airgun 10.

The airgun 10 is triggered into its firing mode by an electrically energizable solenoid-operated valve 24 mounted on an outer endwall 25 of the operating-chamber housing 14. Such a solenoid valve 24 and such use of a solenoid valve for triggering the firing of an airgun is well known in the art and forms no part of the invention being claimed.

When the airgun is triggered into its firing mode by the solenoid valve 24, the pressurized gaseous fluid 18 suddenly is allowed to expand out of the firing chamber, and this expanding gaseous fluid blasts outwardly in all radial directions through the discharge port 16 extending continuously for 360° around the longitudinal axis o the airgun. This outwardly blasting, expanding gaseous fluid 18 has a relatively low range of densities (relatively low range of mass per unit volume). Moreover, this outwardly blasting, expanding gaseous fluid is experiencing a reduction in its density while it is pushing outwardly against the surrounding ambient water medium 20. This water medium 20, for example, such as a body of salt water, is relatively much more dense and is relatively incompressible (relatively non-compressible) as compared with the outwardly blasting, expanding gaseous fluid 18. In other words, an energy transfer is occurring between a relatively low density expanding gaseous fluid 18 and a relatively high density, relatively incompressible water medium 20. The outwardly flaring horn-like configuration 21, 22 of the discharge port 16 which extends continuously around the longitudinal axis of the airgun for 360° is designed for enhancing dynamic coupling between outwardly blasting, expanding gaseous fluid 18 and the surrounding relatively dense water medium 20 for enhancing the generation of seismic energy waves in the water medium 20 for deeper penetration of seismic energy into the earth, so as to provide more seismic data. Also, this continuous 360° outwardly flaring discharge port 16 is designed to maximize peak pressure of an initial pressure pulse generated in the water medium 20 by this blast 18 relative to the peak pressures of any secondary (subsequent) pressure pulses created in the water medium 20 subsequent to the initial pulse.

It is to be noted that the first and second housings 1 and 14 are mechanically interconnected solely by shuttle guide means 26 of circular cross-sectional shape having a surface 28 concentric with the longitudinal axis 30 (FIGS. 2 and 3) of the airgun 10. In this embodiment of the monoport airgun 10, the shuttle guide means 26 comprises a shaft member connecting together the first and second housings 12 and 14.

Figure 2:
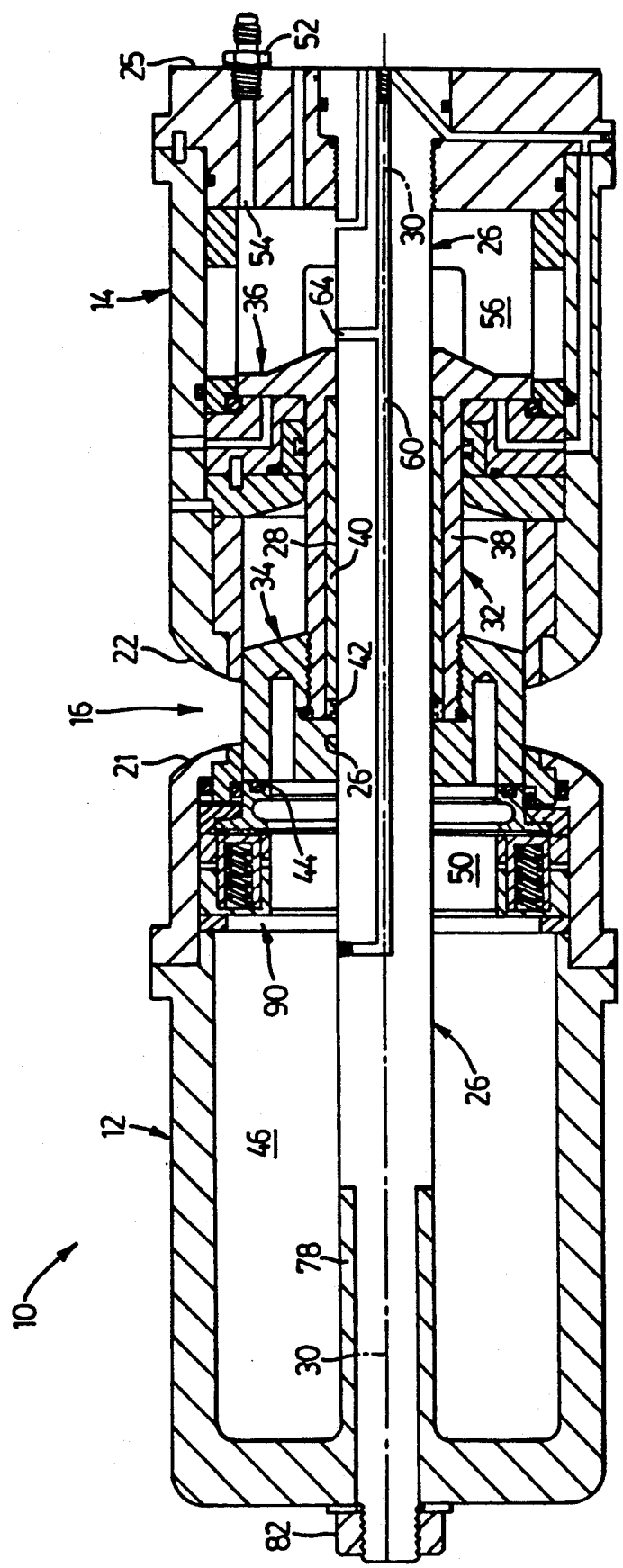
FIG. 2 is an axial sectional view of a monoport airgun such as shown in FIG. 1.
Figure 3:
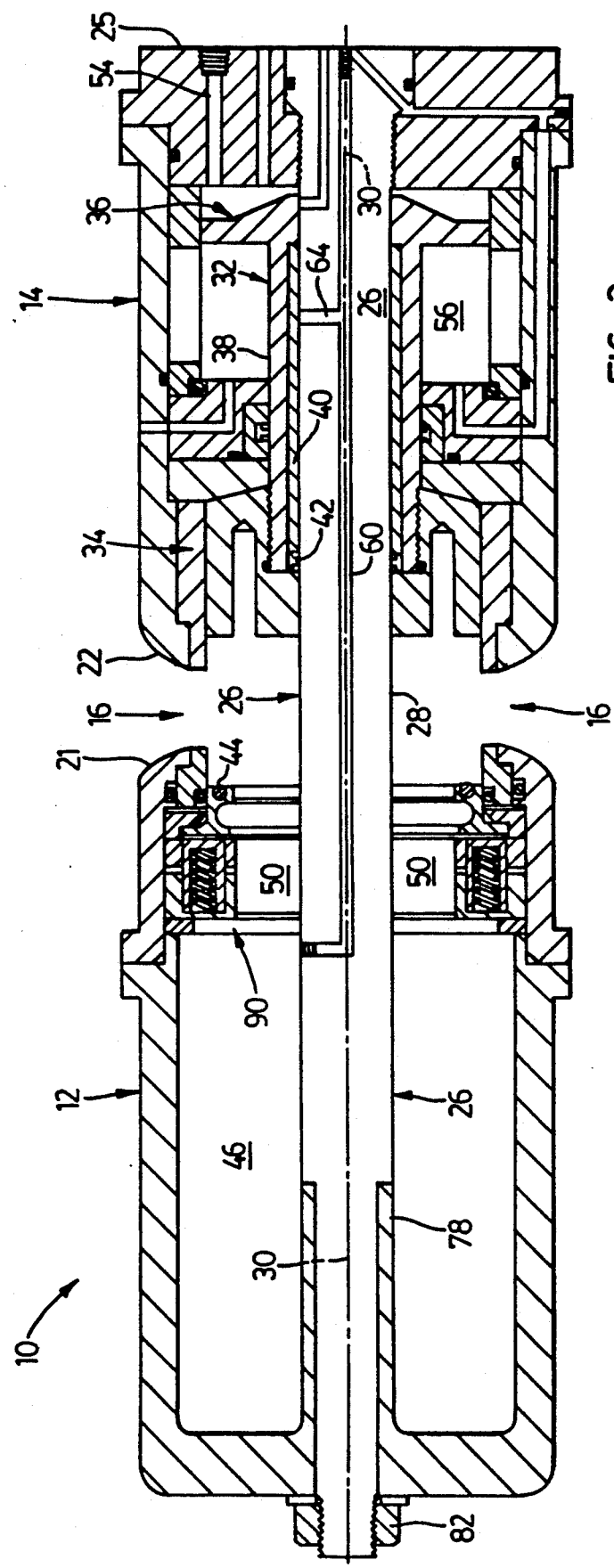
FIG. 3 is an axial sectional view of the monoport airgun of FIG. 1 showing the shuttle in its open firing position.

A shuttle 32 encircles the guide 26 and is slidable along the guide surface 28 between a closed position as shown in FIG. 2 and an open position as shown in FIG. 3. This shuttle 32 includes a firing piston 34 and an operating piston 36 connected to the firing piston by a hollow shaft 38. Within this hollow shaft 38 is a shuttle gland sleeve bearing 40 mounted in slidable relationship on the guide surface 28. For providing a slidable sealing action between the movable shuttle 32 and the fixed, stationary guide surface 28, there is a T-seal 42 encircling the guide 26 and being located at the firing piston end of the sleeve bearing 40.

When the shuttle 32 is in its closed initial position (FIG. 2), the firing piston 34 engages a firing seal 44 for closing a firing chamber 46 provided within the first housing 12. Pressurized gaseous fluid is charged into this closed firing chamber 46 in a manner to be explained later. When the shuttle 32 suddenly moves to its open position (FIG. 3) it allows the pressurized gaseous fluid 18 (FIG. 1), for example which usually is compressed air of a pressure within the range from about 1,500 psi to about 3,000 psi, suddenly to be released from the firing chamber 46. This released compressed air (or other pressurized gaseous fluid) 18 rapidly expands out of the firing chamber 46 and forcefully blasts out through the discharge port 16 as a powerful blast indicated by the arrows 18 in FIG. 1.

It is noted (FIG. 3) that there is a discharge throat 50 located between the firing chamber 46 and the single 360° discharge port 16, and this discharge throat has a circular, symmetrical 360° annular shape. Consequently, a round discharge throat is feeding a round discharge port. Thus, the expanding discharge blast 18 (FIG. 1) is issuing from the single firing chamber 46 in a symmetrical round pattern right from the start of its sudden release from the firing chamber. In other words, there is no need for the outrushing, expanding gaseous fluid 18 such as compressed air to reconfigure its pattern into a multiple-port discharge nor is there a need for a four-throat discharge pattern to reconfigure itself into a sleeve-gun discharge as occurs in sleeve guns in use today. Thus, I believe that the firing chamber 46 will discharge most of its contents in a very short time, because it is not port-limited nor throat-limited. I believe that this faster discharge from the monoport airgun will likely generate a higher initial peak pressure pulse in the surrounding water medium than generated by a multi-port airgun or by a multi-throat sleeve airgun having a firing chamber of equal size operating at the same compressed air pressure in the firing chamber and operating at the same depth beneath the surface in a relatively large body of water. Also, I foresee that the resulting "signature" of the monoport airgun may likely generate a desirably larger ratio of initial peak pressure pulse in the surrounding water medium than the peak pressures of subsequent (secondary) pressure pulses occurring in the water medium.

Figure 4:
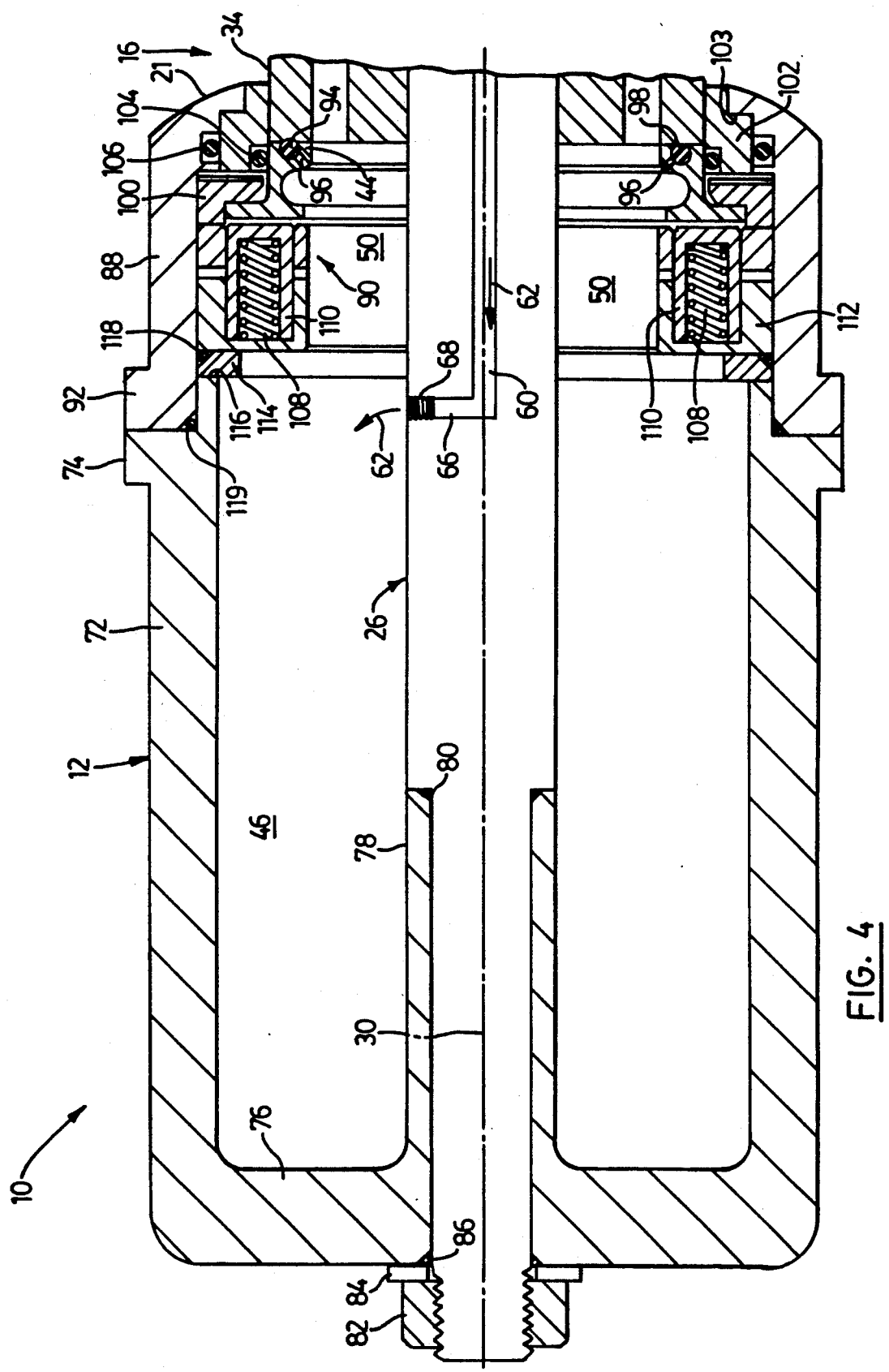
FIG. 4 is an enlarged partial axial sectional view of the firing chamber end of the monoport airgun for more clearly showing various components.

In order to charge the firing chamber 46 with pressurized gaseous fluid, for example compressed air, there is an inlet fitting 52 (FIG. 5) in the endwall 25 communicating through a passage 54 with an operating chamber 56 provided within the second housing 14. Arrows 58 indicate the infeed of compressed air through the fitting 52 and through the passage 54. This compressed air is fed from the operating chamber 56 through the shuttle guide 26 via an axially extending passageway 60. As shown by an arrow 62 the incoming compressed air 58 enters the axially extending passageway 60 through a lateral entrance hole or passage 64. The supply of compressed air 62 goes along this passageway 60 and exits into the firing chamber 46 via a lateral exit hole or passage 66 (FIG. 4) as indicated by arrows 62 (FIG. 4). This exit passage 66 may include an orifice plug (not shown) screwed into threads 68 for controlling the desired rate at which compressed air 62 can flow into the firing chamber 46 for re-charging this firing chamber during repeated cycles of firing of the airgun 10.

Figure 5:
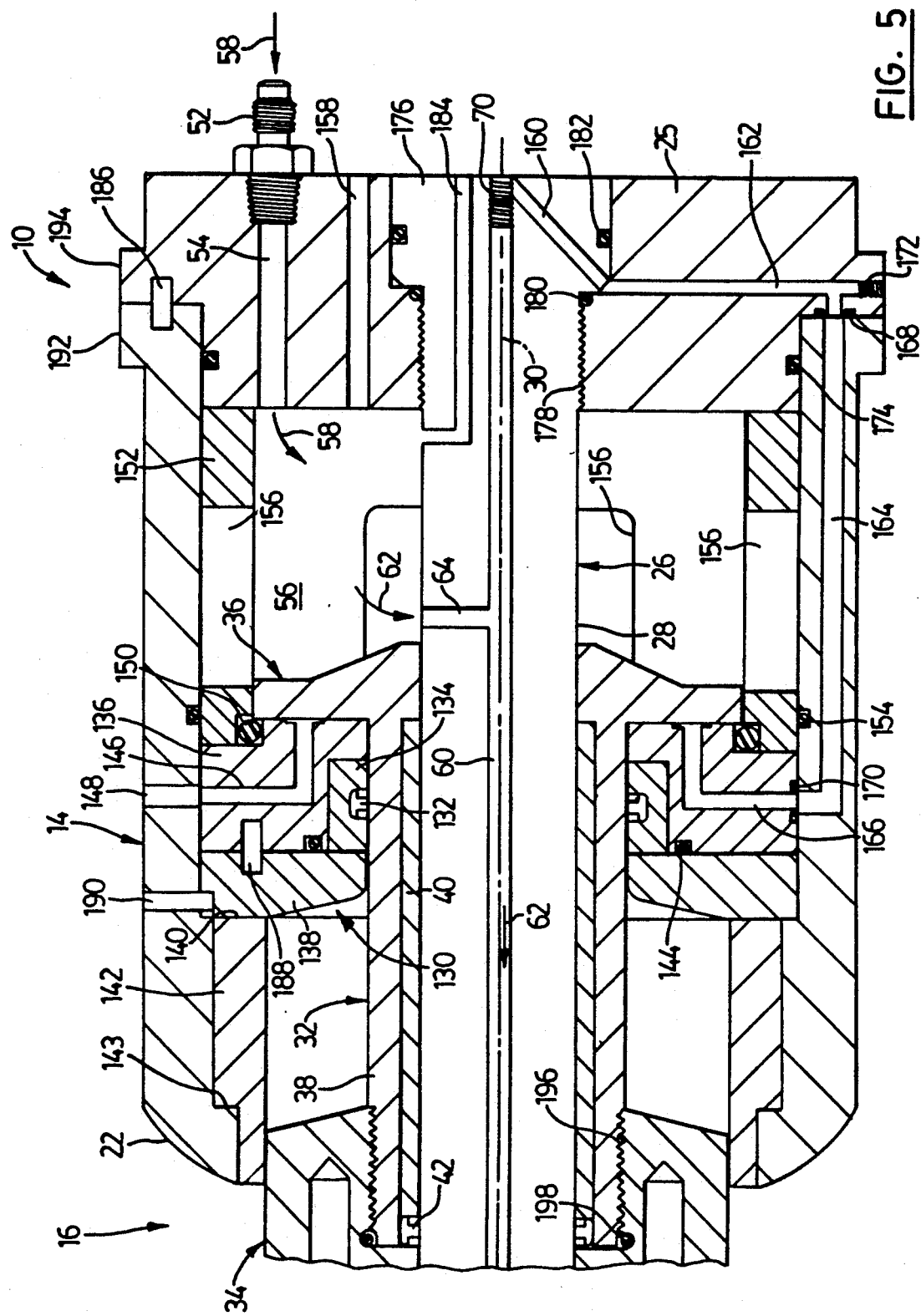
FIG. 5 is an enlarged partial axial sectional view of the operating chamber end of the monoport airgun for more clearly showing various components. It is noted that FIGS. 4 and 5 show a shuttle in its closed position for explaining infeeding of pressurized gaseous fluid into a firing chamber.

The axially extending passageway 60 may be formed as shown in FIG. 5 by drilling from the operating end of the shuttle guide means 26 and then by plugging the end of this passageway 60 by a screw plug or set screw 70.

The firing chamber housing 12 (FIG. 4) includes a generally cup-shaped casing having a cylindrical sidewall 72 with an external mounting flange 74 and an endwall 76. In order to fasten the central shuttle guide 26 securely to the firing chamber housing 12, the endwall 76 of the firing chamber may incorporate a socket 78 for receiving an end portion of the shuttle guide 26 and being sealed to the shuttle guide by a O-ring 80. A nut 82 screwed onto the guide 26 and a washer 84 hold the firing chamber housing 12 on the shuttle guide with another O-ring 86 for sealing the firing chamber 46. It is to be understood that the objective is to provide a secure, rigid and durable interconnection between the shuttle guide 26 and the firing chamber housing 12.

In FIG. 4, for convenience of access and assembly the firing chamber casing is shown as including a cylindrical sidewall portion 88 encircling a firing seal assembly 90. This sidewall 88 has an external mounting flange 92 mating with the flange 74. It is to be understood that these two mating flanges 74, 92 are clamped together by a removable clamp ring assembly (not shown for clarity of illustration) encircling these two flanges as is known in the art of airguns for seismic exploration. Thus, the size (available volume) of the firing chamber 46 can be changed by removing the cup-shaped housing 72, 76, 78 and replacing with other housings having smaller or larger firing chamber volumes. For example, to provide decreased internal volume 46, a smaller diameter sidewall 72 may be incorporated in the firing chamber housing 12, and conversely to provide increased internal volume, a larger diameter sidewall 72 may be incorporated in this housing 12.

The firing seal assembly 90 (FIG. 4) includes a firing seal O-ring 94 mounted in and carried by a tough, durable firing seal 44 having generally an L-shaped cross section. To prevent undesired accumulation of compressed air beneath the O-ring 94 in its mounting groove in the firing seal 44 for preventing dislodgment of this O-ring during firing there are multiple small drill holes 96 (only two are seen), for example twelve of these small drill holes in the firing seal uniformly spaced around the axis 30. The firing piston 34 may or may not be cup shaped. In FIGS. 2 through 5 this firing piston is shown as having a cup shape, and its rim 98 engages in sealing relationship against the firing seal 44 and its O-ring 94 when the shuttle 32 is in its closed position as is shown in FIGS. 2, 4 and 5.

Also included in the firing seal assembly 90 (FIG. 4) is a firing seal gland 100 having a generally L-shaped cross-section. This firing seal gland 100 and sleeve 102 encircle the firing seal 44. The gland 100 overlaps an outwardly projecting flange on the L-shaped firing seal 44. The sleeve 102 (FIG. 4) is removable, and it encircles the rim 98 of the firing piston 34 in its closed position. The firing seal 44 is in axially slidable sealing relationship within the sleeve 102 by means of an O-ring 104. The sleeve 102 is retained in its position by an internal locating shoulder 103 (FIG. 4) formed in the sidewall 88 and located near the discharge port 16. The sleeve 102 is sealed to the wall 88 of the firing chamber by another O-ring 106 mounted in a groove in this wall. In order to urge the firing seal 44 toward the firing piston 34, multiple compression springs 108, for example twelve of them, are mounted in captured relationship within their respective spring inserts 110 held in axially movable relation in a spring retainer 112 backed by a ring 114 seated against a locating shoulder 116 provided by the firing chamber wall 72. An O-ring 118 is held in sealing relation by the ring 114 against the spring retainer 112 and against the firing chamber sidewall portion 88, and an O-ring 119 seals the cylindrical sidewall 72 of the firing chamber housing 14 to the cylindrical sidewall portion 88.

The firing seal assembly 9 encircles the annular discharge throat 50. It is noted again, as explained earlier above, that this annular discharge throat is symmetrically round around the airgun axis 30, and this discharge throat 50 advantageously feeds directly into the discharge port 16 which also is symmetrically round around this same axis 30.

Encircling the shaft 38 of the shuttle 32 is a shuttle shaft seal assembly 130 (FIG. 5) including a T-seal 132 held in its gland 134 so that the shuttle shaft is movable through the shaft seal assembly 130 in slidable sealed relationship relative to this assembly. This shaft seal assembly 130 includes upper and lower shaft seal retainers 136 and 138 for holding the gland 134 in captured relationship. The lower retainer 138 seats against a shoulder 140 formed by an end of a removable shuttle sleeve 142. This sleeve 142 seats against an internal shoulder 143 which is within the operating-chamber housing 14 and is located near the discharge port 16. For providing a seal between the upper and lower shaft seal retainers 136 and 138 there is an O-ring 144 mounted in a groove in the upper retainer. For preventing undesired accumulation of compressed air (or other pressurized gaseous fluid being used) between the operating piston 36 and the shuttle shaft seal assembly 130, there is a bleed passage 146 in the upper retainer 136 communicating with the ambient water medium 20 (FIG. 1) through an outlet 148 in the wall of the operating chamber housing 14. This outlet 148 may include a orifice plug (not shown) having a orifice of desired size for regulating the rate of bleeding of gaseous fluid, e.g., compressed air, through the bleed passage 146.

When the shuttle is in its closed position as shown in FIGS. 2, 4 and 5, the rim of the operating piston 36 contacts a shuttle operating seal 150. This shuttle operating seal 150 is held against an external rabbet in the upper shaft seal retainer 136 by a cylindrical sleeve 152 encircling the operating chamber 56. This operating-chamber sleeve 152 is removable and is in sealed relation with the cylindrical housing 14 of the operating chamber 56 by means of an O-ring 154 mounted in a groove in this housing. There are a plurality of by-pass cut-outs 156, for example four (only three are seen) in the operating chamber sleeve 152, and such by-pass cut-outs 156 in the operating chamber sidewall of an airgun are well known in the art as a result of pioneering inventions by Stephen V. Chelminski in this field of airguns for seismic exploration.

In order to trigger the firing discharge of the airgun 10, the solenoid-operated valve 24 (FIG. 1) is electrically energized for allowing compressed air (or other pressurized gaseous fluid being used) to travel through a first firing passage 158 (FIG. 5) in the endwall 25 and thence through the solenoid-operated valve 24 into a second firing passage 160. For clarity of illustration the solenoid-operated valve 24 is omitted from FIGS. 2, 3, and 5. A suitable solenoid valve 24 for this purpose is commercially available from Bolt Technology Corporation of Norwalk, Connecticut, U.S.A., and is suitably mounted to the endwall 25 as known in the art. The pressurized gaseous fluid, e.g., compressed air, travels from the second passageway 160 through a sequence of firing trigger passages 162, 164 and 166 leading to a region between the operating piston 36 and the shuttle shaft seal assembly for causing the operating piston 36 to be lifted away from the shuttle operating seal 150 so that the shuttle 32 becomes suddenly slid along its internal guide 26 to its open position as shown in FIG. 3. The resulting sudden separation of the firing piston 34 from the firing seal 44 releases the charge of pressurized gaseous fluid such as compressed air to expand in a sudden powerful blast rushing through the annular throat 50 and thence directly out through the single discharge port 16 as shown by the arrows 18 in FIG. 1.

For sealing the sequence of firing trigger passages 162, 164 and 166, there in an O-ring 168 located between the endwall 25 and the operating chamber housing 14 mounted in a groove in the end wall encircling the passage 164. Similarly, there is an O-ring 170 located between the operating chamber housing 14 and the upper shuttle shaft seal retainer 136 mounted in a groove in this retainer encircling the passage 166. The passage 162 in the endwall 25 may be formed by drilling inwardly through the perimeter of this endwall and then by plugging th outer end of the drill hole with a screw plug of set screw 172. A seal for the operating chamber 56 is provided between the endwall 25 and the operating chamber housing 14 by an O-ring 174 mounted in a groove in a rabbet extending around the perimeter of this endwall. An end portion of the housing 14 is received in this rabbet provided in the perimeter of the endwall 25.

For providing a secure, rigid and durable interconnection between the shuttle guide 26 and the endwall 25 an enlarged head portion 176 of the shuttle guide 26 is fitted into a central socket opening in the endwall 25 with the guide 26 being held in the endwall by screw threads 178. An O-ring seal 180 is captured by the stepped configuration of the shuttle guide 26 adjacent to its enlarged head 176, and another O-ring 182 is mounted in a groove extending around this enlarged head 176 fitting into the central socket in the endwall 25.

As shown in FIG. 5, the endwall 25 may include a firing-sensor passage 184 for providing communication between the firing chamber 56 and a pressure-responsive firing sensor (not shown) mounted in the housing of the solenoid valve 24 for providing an electrical signal indicating the actual instant of time when the airgun is fired (often called a "time-break" signal). A suitable time-break solenoid valve 24 housing such a sensor is commercially available from the above-mentioned Bolt Technology Corporation.

In order to assure that the endwall 25 is assembled in appropriately aligned relationship with the operating chamber housing 14 for the firing trigger passages 162 and 164 to be in communication, there is an alignment pin 186 press-fitted into the housing 14 and engageable into socket in the endwall 25. Similarly, to assure appropriate alignment between the firing trigger passages 166 and 164 and also to assure appropriate alignment between the bleed passage 146 and its outlet port 148, there is an alignment pin 188 press-fitted into the lower shaft seal retainer 138 and engageable into a socket in the upper retainer 136, and also acting in cooperating alignment relationship with this first pin 188 there is a second alignment pin 190 press-fitted into the housing 14 and engageable into a notch in the perimeter of the lower retainer 138.

For removably fastening the endwall 25 to the operating chamber housing 14, there are mating flanges 192, 194 (FIG. 5) on the housing and endwall, respectively. It is to be understood that these two mating flanges 192, 194 are clamped together by a removable clamp ring assembly (not shown for clarity of illustration) encircling these two flanges as is known in this art of airguns for seismic exploration.

The firing piston 34 is securely connected with the shuttle shank 38 as is shown in FIG. 5 for providing a strong, durable, shuttle 32 having generally a spool shape. For example, the firing piston 34 may be assembled with the shank 38 by screwing a threaded socket of the firing piston onto a threaded end portion 196 of the shuttle shank. A O-ring 198 located in a groove encircling the bottom of the threaded socket in the firing piston 34 provides a sealed relationship between the shuttle shank and the firing piston.

In operation, the firing chamber 46 (FIG. 4) is charged with pressurized gaseous fluid, for example compressed air, to a desired pressure level by supplying the desired pressurized gaseous fluid as shown by arrows 58 and 62 in FIG. 5 through the inlet fitting 52 and through passage 54 into chamber 56 and thence through passageway 64-60-66 into the firing chamber 46 (FIG. 4) as is shown by the arrows 62 in FIGS. 5 and 4. At a desired instant in a seismic exploration operation after the firing chamber 46 has been charged to a desired pressure level, the solenoid valve 24 (FIG. 1) is actuated, for causing the shuttle 32 suddenly to move to its open position as shown in FIG. 2, thereby producing a powerful discharge blast 18 as shown in FIG. 1 for generating seismic energy waves in the surrounding water medium to be transmitted into the Earth for obtaining seismic exploration data. After this discharge blast 18 has occurred, the shuttle 32 is automatically returned from its open to its closed position by the push (thrust) of pressurized gaseous fluid in the operating chamber 56 acting upon the available and effective propulsion area of the hollow shuttle shank 38. This available and effective propulsion area of the shuttle shank 38 is defined by the lesser diameter inner dynamic seal 42 (FIG. 5) in sliding contact with the circular cylindrical guide surface 28 of the guide 26 and by the greater diameter outer dynamic seal 132 in sliding contact with the outer circular cylindrical surface of the shuttle shank 38. As soon as the shuttle 32 has returned to its fully close position with its firing piston rim 98 (FIG. 4) in sealing engagement with the firing seal 44 and its O-ring 94, the firing chamber 46 is closed and ready to be recharged to the desired pressure level in readiness for the next cycle of firing operation.

Advantageously, in operation as shown in FIG. 3, while the shuttle 32 is momentarily in its open position during each cycle of firing operation it automatically blocks the entrance hole 64 and thereby shuts off the supply passageway 64-60-66 to the firing chamber 46 so that pressurized gaseous fluid cannot flow through this passageway 64-60-66 into the now open firing chamber 46. When the shuttle 32 momentarily is in its open position as is shown in FIG. 3 the sleeve bearing 40 momentarily covers the inlet 64 as is shown in FIG. 3. Such automatic shut-off of the supply passageway 64-60-66 to the now open firing chamber 46 conserves energy by preventing wasteful dumping of pressurized gaseous fluid into the open firing chamber and thence into the ambient medium 20 (FIG. 1). Moreover, in addition to such conservation, the automatic momentary shut off of the supply during each operating cycle makes operation of the airgun reliable, consistent and stable, because residual pressure in the firing chamber 46 immediately after discharge 18 is not allowed to be unexpectedly modulated by a premature inrush supply 62 of pressurized gaseous fluid into the discharged firing chamber 46. The residual gaseous fluid pressure in the discharged firing chamber 46 opposes the push (thrust) of the gaseous fluid pressure in the operating chamber 56 acting to return the shuttle back to its fully closed position. When the firing piston 34 (FIG. 4) has almost returned into contact with the firing seal 44, the residual gaseous fluid pressure in the firing chamber 46 now has an opportunity to push (thrust) against effectively the entire area of the almost-closed firing piston 34 which is exposed to the firing chamber. This area of the almost-closed firing piston 34 exposed to the firing chamber 46 is many times larger than the available effective propulsion area of the hollow shuttle shank 38 defined between the inner and outer dynamic seals 42 and 132 (FIG. 5) exposed to the push (thrust) of the pressurized gaseous fluid in the operating chamber 56. Thus, in the almost-closed position of the shuttle 32, there is a great disparity between these respective areas exposed to the opposed pushes (opposed thrusts) of the respective pressures of gaseous fluid in the respective firing and operating chambers 46 and 56. This great disparity in pressure-exposed areas favors the push (thrust) of residual pressure in the firing chamber which is now opposing full closure of the firing piston 34. Consequently, a relatively small modulation of this residual pressure due to a premature inrush supply 62 (FIG. 5) can considerably and undesirably modify the rate of return of the shuttle 32 to its fully closed position and thereby can undesirably destabilize the desired cyclic repeatability of firing operation of an airgun which lacks such an automatic shut off of supply during each cycle of operation while the shuttle momentarily is in its open position.

It is to be understood that this monoport airgun 10 is suitably constructed so as to be strong, tough, durable and corrosion-resistant as known in the art for constructing airguns for seismic exploration. For example suitable high-strength stainless steel material may be used to advantage. The dynamic sliding seals 42 and 132 may be T-seals of suitable size for example such as those which are commercially available from the Parker Seal Group of Irvine, Calif., U.S.A. The shuttle gland sleeve bearing 40 and the spring inserts 110 are made of tough, durable, slippery bearing material of suitable character for running along the corrosion-resistant cylindrical shuttle guide surface 28 and for accommodating movement of the springs 108, for example this slippery bearing material may be such as is commercially available under the designation "Teflon" or "Delrin". The shuttle sleeve 142, the back up ring 114 and the firing seal gland 100 are constructed of suitable high-strength corrosion-resistant material, for example the material for making these parts 100, 114 and 142 may be high-strength, corrosion-resistant bronze.

Figure 6:
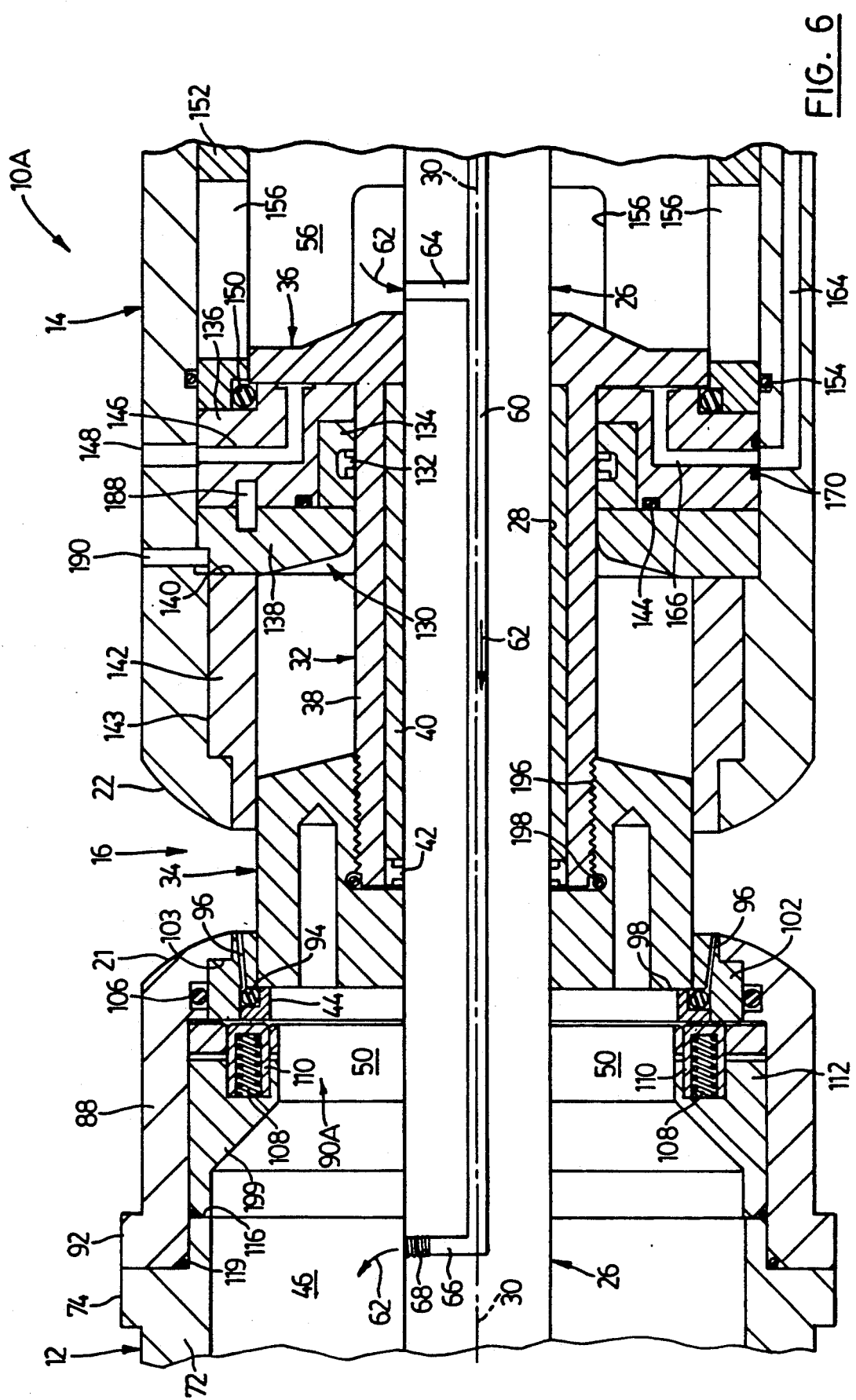
FIG. 6 is a partial axial sectional view of a modified embodiment of the monoport airgun in which a firing seal encircles the rim of the firing piston of the shuttle in its closed position. This FIG. 6 arrangement of a firing seal provides more available room for accommodating sudden rapid expansion of pressurized gaseous fluid blasting from the firing chamber through an annular discharge throat extending continuously around the longitudinal axis of the airgun into the discharge port extending continuously around the same longitudinal axis of the airgun.

In FIG. 6 is a partial axial sectional view of a monoport airgun 10A which is shown to have the same construction as the monoport airgun 10 in FIGS. 2-5, except that the firing seal assembly 90A is arranged to provide a relatively increased space encircling 360° around the cylindrical shuttle guide surface 28. This increased space around the shuttle guide surface 28 is provided for obtaining a discharge throat 50 of increased cross sectional area relative to the discharge throat 50 shown in the monoport airgun 10 in FIGS. 2, 3 and 4 for enabling a quicker, more powerful discharge blast 18 to occur by pressurized gaseous fluid expanding from the firing chamber 46 out through the 360° annular discharge throat 50 and thence directly out through the 360° discharge port 16. The firing seal assembly 90A as shown in FIG. 6 is arranged generally similar to the firing seal assembly shown in FIG. 8 of U.S. Pat. No. 4,779,245 issued Oct. 18, 1988, in which Stephen V. Chelminski is the inventor. Thus, the general arrangement of the present firing seal assembly 90A is not claimed as part of my invention. The purpose of FIG. 6 is to show how advantageously suitable this monoport airgun is for having a relatively large unobstructed 360° annular discharge throat 50 feeding directly into the 360° discharge port 16.

In the present firing seal assembly 90A, there is a firing seal ring 44 of generally L-shaped cross section carrying an O-ring 94 against which engages a peripheral edge portion of the rim 98 of the firing piston 34, when the firing piston is in its fully closed position. The sleeve 102 which encircles the firing seal ring 44 is generally similar to the sleeve 102 in FIG. 4. This sleeve 102 is sealed to the sidewall portion 88 of the firing chamber 12 by an O-ring 106 which is received in a groove in the sidewall portion 88, the same as the O-ring 106 shown in FIG. 4. The sleeve 102 includes a plurality of small drill holes 96, for example twelve of them, leading to the discharge port 16 for preventing pressurized gaseous fluid from accumulating behind the O-ring 94 for preventing dislodging of this O-ring 94 during firing.

In order to push the firing seal 44, 94 toward engagement with the firing piston 34, a multiplicity of compression springs 108 like those shown in FIG. 4, for example twelve of these springs, in their respective spring inserts 110 are mounted in their respective sockets in the spring retainer 112. This present spring retainer 112 seats against the locating shoulder 116 and serves to retain the sleeve 102 in place against the internal shoulder 103 which is formed in the sidewall 88 and is located near the discharge port 16. An exposed surface 199 of the spring retainer 112 is sloped for accommodating the desired, sudden, explosive-like blast 18 (FIG. 1) of expanding gaseous fluid blasting from the firing chamber 46 through the annular discharge throat 50 and directly out through the discharge port 16 during firing of this monoport airgun 10A.

An alternative arrangement for providing a secure, rigid and durable interconnection between the shuttle guide 26 and the endwall 25 (FIGS. 2, 3 and 5) is to weld the head end 76 of the shuttle guide in the socket in the endwall and also to weld around the guide 26 on the inside of the endwall 25. Among advantages of such a integral welded connection is that the O-rings 180 and 182 are not needed. Thus, the joint between the shuttle guide 26 and the endwall 25 may be welded both externally and internally of the endwall 25. Then, the shuttle guide 26 and endwall 25 are stress-relieved and are machined to their desired final dimensions It is to be noted in FIGS. 2 through 8 that the shuttle 32 includes a firing piston 34, an operating piston 36 which is axially spaced from the firing piston and a hollow shaft 38 which interconnects the firing and operating piston providing a shuttle having generally an overall spool-like shape. In many prior airguns a shuttle having generally an overall spool-like shape is guided in movement between open and closed positions by sliding peripheral portions of the firing and operating pistons along external guide surfaces. In other words, such prior shuttles which are guided by peripheral portions of the two pistons are being peripherally guided at opposite ends of their spool-shape. Such peripheral, opposite-ended guidance of a spool-shaped shuttle may allow the shuttle to chatter somewhat in its very fast sudden movement between closed and open positions. In distinction to such peripheral guidance, the shuttles 32 in FIGS. 2 through 8 are centre-mounted and are centre-guided.

In these shuttles 32 of monoport airguns embodying the present invention the operating piston 36 is axially spaced from the firing piston 34 and a hollow cylindrical member 38 interconnects these two pistons. This hollow cylindrical member 38 of the shuttle 32 extends around the guide surface 28 of the guide 26, and the shuttle in movement between closed and open positions is guided solely by the guide surface 28. In some monoport airguns embodying the present invention an elongated sleeve bearing 40 is mounted within the hollow cylindrical member 38 of the shuttle and is carried by the shuttle in sliding movement along the guide surface 28 for providing straight-line axial movement of the shuttle in accurate alignment with the longitudinal axis of the airgun. In other monoport airguns embodying the invention the firing piston 34, operating piston 36 and their hollow interconnecting member 38 may comprise an integral structure and the shuttle guide means 26 has a circular cylindrical surface encased by an elongated bearing 40A (FIG. 7) concentric with the longitudinal axis of the airgun, and the shuttle in movement between closed and open positions is guided by sliding along the elongated bearing 40A for providing straight-line axial movement of the shuttle in accurate alignment with the longitudinal axis of the airgun.

Figure 7:
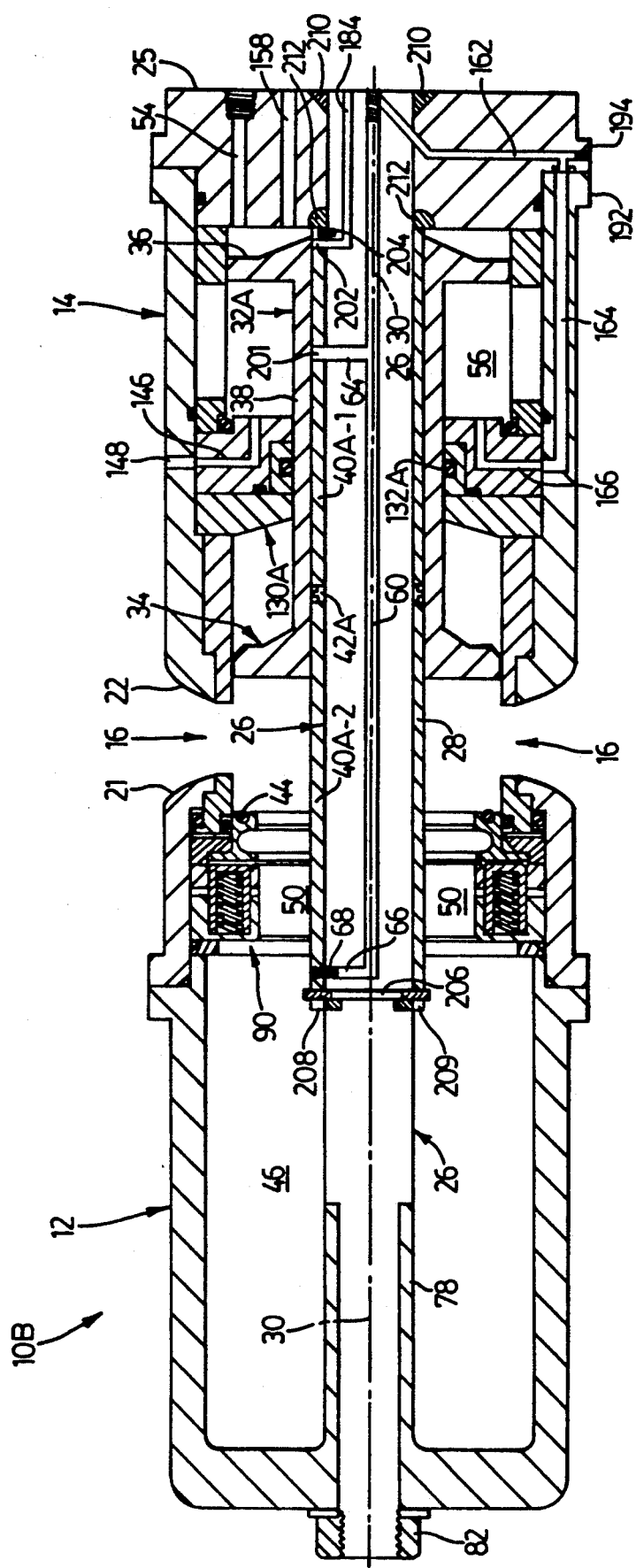
FIG. 7 illustrates a one-piece shuttle which can be employed, if desired, in a monoport airgun embodying the invention.

In the monoport airgun 10B shown in FIG. 7 the shuttle 32A includes a firing piston 34, an operating piston 36 and a hollow shank 38 interconnecting these pistons. These pistons and said hollow shank are formed as an integral one-piece structure. In order to provide an elongated bearing guide surface 28 extending parallel with the longitudinal axis 30 of this monoport airgun 10B, an elongated stationary sleeve bearing 40A is mounted on the shuttle guide 26. This elongated stationary sleeve bearing 40A includes first and second sleeves 40A-1 and 40A-2 with an outwardly facing stationary seal 42A positioned between these two bearing sleeves 40A-1 and 40A-2. This stationary seal 42A is in sliding sealing relationship with the shuttle 32A and is positioned along the guide 26 for remaining in slidable sealing relationship with the shuttle in its closed position and also in its open position. The shuttle 32A is shown in FIG. 7 in its open position.

The bearing sleeve 40A-1 has parts therein at 201 and 202 communicating with the supply inlet passage 64 and with the firing trigger passage 184, respectively. A threaded pin 204 is screwed into a socket in the guide 26 and fits in a notch in the end of the bearing sleeve 40A-1 for retaining this bearing with the ports 201 and 202 in alignment with the passages 64 and 184, respectively.

For keeping the sleeve bearings 40A-1 and 40A-2 and the bearing 42A located between them in their respective positions on the guide 26 as shown in FIG. 7, there is a stainless steel washer 206 engaging the end of the stationary sleeve bearing 40A-2. This washer 206 is held in position by a pair of threaded pins 208 and 209 which are screwed into sockets in the guide 26.

The bearing sleeve 40A-2 has an outlet port or notch therein communicating with the outlet 66 from the pressurized gaseous supply passage 60 in the guide 26. This outlet port or notch in the bearing sleeve 40A-2 is kept in alignment with the outlet 66 by an orifice plug 68 (FIG. 7) screwed into the threaded outlet 66. This orifice plug 68 has a passag therethrough providing communication from the outlet 6 into the firing chamber 46.

The guide 26 is rigidly secured to the endwall 25 by a first weld 210 encircling the end of this guide at the outside surface of the endwall 25 and by a second weld encircling this guide at the inner surface of the endwall 25.

In order to place the shuttle shaft seal retainer assembly 130A (FIG. 7) around the tubular shuttle shank member 38 between the firing and operating pistons 34 and 36 of the generally spool-shaped shuttle 32A, this shuttle shaft seal retainer assembly 130A has a split construction such as is shown and explained in U.S. Pat. No. 4,779,245 to which reference has been made above. In this retainer assembly 130A, the T-seal 132 (FIG. 5) is replaced with a split O-ring 132A (FIG. 7). Except for these differences as already explained, the monoport airgun 10B is similar to the monoport airgun 10 shown in FIGS. 1 through 5.

Figure 8:
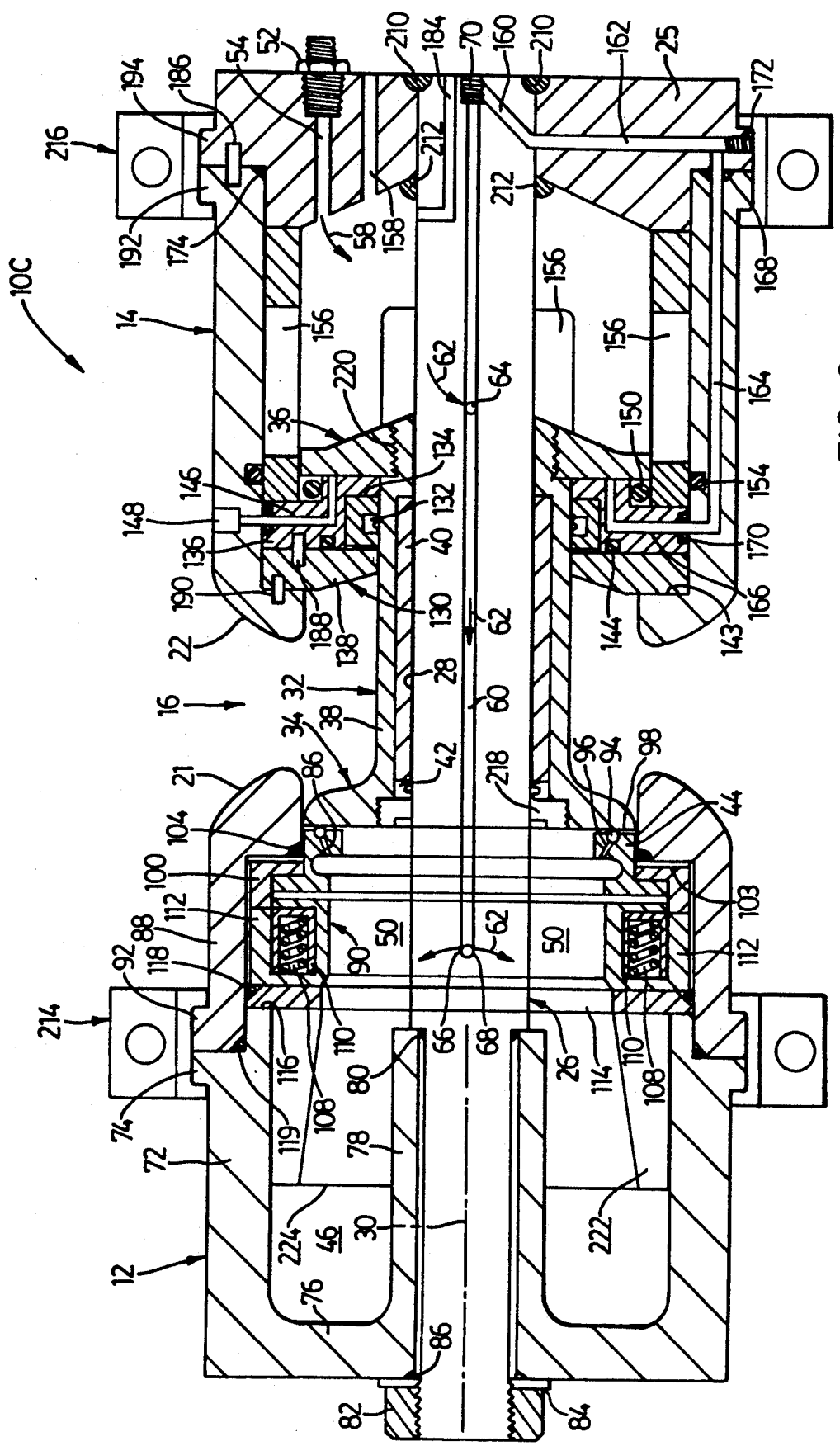
FIG. 8 shows a modified monoport airgun embodying the present invention.

The monoport airgun 10C shown in FIG. 8 is generally similar to the monoport airgun 10 shown in FIGS. 1 through 5, except that the shuttle guide 26 is welded into the endwall 25 at 210 and 212. Also, for purposes of illustration, ring clamps 214 and 216 are shown clamping together the mating flanges 74, 92 and 192, 194, respectively. The shuttle 32 is generally spool-shaped.

For securing the dynamic seal 42 and the sleeve bearing 40 in place within the hollow shank 38, there is a retainer ring 218 screwed into a threaded socket in the firing piston. The operating piston 36 is secured to the hollow-shank 38 by screwing onto a threaded region 220 o the shank.

In order to provide firing chambers 46 of various volumes without changing the external dimensions of the firing chamber housing 12, the back-up ring 114 may include thereon one or more projections 222 extending into the firing chamber 46 for reducing its effective volume. It is to be understood that this projection 222 may have the shape of a sleeve 224 extending around the firing chamber 46 in contact with the inside surface of the cylindrical sidewall 72.

It will be understood by those skilled in the ar that various changes may be made in the above-described illustrative monoport airguns embodying this invention without departing from the true spirit and scope of the invention a claimed in the following claims.

I claim:

1. An airgun discharging at a monoport for seismic exploration comprising:
   an airgun having a longitudinal axis;
   a first housing for providing a firing chamber;
   a second housing for providing an operating chamber;
   said first and second housings being positioned in alignment along said axis;
   said first and second housings being spaced apart along said axis for providing a discharge port between said first and second housings;
   said discharge port extending continuously 360° around said axis and having an outwardly flaring horn-like configuration with generally exponentially shaped sidewalls;
   said first and second housings being interconnected at said discharge port solely by shuttle guide means;
   a shuttle encircling said guide means and being slidably mounted on said guide means;
   said shuttle being movable along said guide means between closed and open positions;
   said shuttle in said closed position closing said firing chamber for enabling pressurized gaseous fluid to be contained in said firing chamber;
   said shuttle in said open position opening said firing chamber to said discharge port for allowing pressurized gaseous fluid to be discharged from said firing chamber outwardly through said discharge port extending continuously around said axis; and
   said operating chamber for moving said shuttle between said open position and said closed position.

2. A monopot airgun as claimed in claim 1, in which:
   said shuttle in said open position allows said firing chamber to communicate with said discharge port through a discharge throat extending continuously around said shuttle guide means.

3. A monoport airgun as claimed in claim 2, in which:
   said discharge throat extends continuously 360° around said longitudinal axis of he airgun.

4. A monoport airgun as claimed in claim 1, in which:
   said shuttle guide means has a circular cylindrical guide surface concentric with the longitudinal axis of the airgun;
   said shuttle has elongated sleeve bearing means therein carried by the shuttle and being movable with the shuttle; and
   said elongated sleeve bearing means is slidable along said circular cylindrical guide surface for guiding the shuttle in movement between said closed and open positions.

5. A monoport airgun as claimed in claim 1, in which:
   said shuttle guide mean has a circular cylindrical guide surface comprising an elongated bearing concentric with the longitudinal axis of the airgun;
   said shuttle includes a firing piston, an operating piston spaced from said firing piston, and a hollow cylindrical member interconnects said firing and operating pistons;
   said firing piston, said operating piston and said hollow cylindrical member comprise an integral structure;
   said hollow cylindrical member of the shuttle extends around said elongated bearing; and
   the shuttle slides along said elongated bearing in movement between said closed and open positions.

6. A monoport airgun as claimed in claim 5, in which:
   the shuttle in movement between said closed and open positions is guided by said elongated bearing for providing straight-line axial movement of the shuttle in accurate alignment with the longitudinal axis of the airgun.

7. A monoport airgun as claimed in claim 1, in which:
   said shuttle is co-axially mounted on said guide means; and
   said shuttle is guided in movement between closed and open positions by co-axially mounting relationship with side guide means.

8. A monoport airgun as claimed in claim 7, in which:
   said shuttle has elongated sleeve bearing means mounted therein and being carried by said shuttle in movement between closed and open positions;
   said guide means has an elongated guide surface concentric with the longitudinal axis of the airgun;
   said sleeve bearing means encircles said elongated guide surface in slidable relationship therewith; and
   said sleeve bearing means slides along said elongated guide surface as the shuttle moves between open and closed positions.

9. A monopot airgun as claimed in claim 1, in which:
   said shuttle guide means defined a pathway communicating with said firing chamber for supplying pressurized gaseous fluid into said firing chamber;
   said pathway has an inlet; and
   said shuttle in open position shuts said inlet for preventing pressurized gaseous fluid from being supplied into said firing chamber while the shuttle is in open position.

10. A monoport airgun as claimed in claim 9, in which:
    said shuttle guide means defines said inlet communicating with said operating chamber; and
    said shuttle slides across and blocks said inlet in moving into open position.

11. A monoport airgun as claimed in claim 1, in which:
    axially spaced, opposed portions of said first and second housings define said sidewalls of said discharge port extending continuously around said axis;

said axially spaced opposed portions of said first and second housings encircle the longitudinal axis of the airgun; and said axially spaced opposed portions of said first and second housings are axially spaced progressively farther apart at progressively farther radial distances from said longitudinal axis for providing said discharge port with an outwardly flaring horn-like shape, extending 360° around said longitudinal axis.

12. An airgun discharging at a monopot for seismic exploration comprising:

a shuttle movable between closed and open positions in straight-line motion parallel with a longitudinal axis of the airgun;

shuttle guide means or guiding said shuttle in said straight-line movement between said closed and open positions;

chamber means providing a firing chamber;

said shuttle in said closed position closing said firing chamber for enabling pressurized gaseous fluid to be contained in said firing chamber;

said shuttle in said open position opening said firing chamber for releasing pressurized gaseous fluid from said firing chamber;

said monoport airgun having first and second axially spaced surfaces defining a discharge port between said axially spaced surfaces;

said first and second axially spaced surfaces extending continuously around said shuttle guide means and being spaced from said shuttle guide means for defining said discharge pot extending continuously for 360° around said longitudinal axis of the airgun; and said first and second axially spaced surfaces flaring outwardly progressively farther from each other at progressively greater distances from said longitudinal axis of the airgun so as to be generally exponentially shaped for 360 degrees around said longitudinal axis such that said discharge port has an outwardly flaring horn-like configuration extending continuously 360 degrees around said longitudinal axis.

13. A monport airgun as claimed in claim 12 further comprising:

discharge throat defining means or defining a discharge throat communicating directly with said discharge port when said shuttle is in said open position; and said discharge throat defining means extending continuously around said shuttle guide means and being spaced from said shuttle guide means continuously for 360° around said longitudinal axis of the airgun for providing an uninterrupted discharge throat extending continuously 360° around said longitudinal axis and communicating directly with said discharge port for 360+ around said longitudinal axis.

14. A monoport airgun as claimed in claim 12, in which:

said shuttle guide means defines a pathway for pressurized gaseous fluid to be supplied into said firing chamber; and in said open position the shuttle closes said pathway for preventing pressurized gaseous fluid from being fed into said firing chamber while the shuttle is in open position.

15. A monoport airgun as claimed in claim 12, in which:

said shuttle has sleeve bearing means mounted within the shuttle and said sleeve bearing means is carried by the shuttle in movement between said closed and open positions; and said sleeve bearing means extends around said shuttle guide means in slidable relationship with said shuttle guide means for guiding the shuttle in said straight-line motion parallel with the longitudinal axis of the airgun.

16. A monport airgun as claimed in claim 12, in which:

said shuttle includes a firing piston and an operating piston axially spaced form said firing piston with a hollow tubular member interconnecting said firing and operating pistons;

said firing piston, said operating piston and said hollow tubular member are formed as an internal one-piece structure;

said shuttle guide mean has elongated stationary bearing means extending in an axial direction therealong parallel with said longitudinal axis of he airgun; and said shuttle encircles said elongated stationary bearing means and is mounted on said elongated, stationary bearing means in slidable relationship therewith for guiding said shuttle in straight-line movement parallel with said longitudinal axis between open and closed positions.

17. A monoport airgun as claimed in claim 12, in which:

said shuttle encircles said shuttle guide means and is co-axially mounted on said shuttle guide means and is centrally guided along said shuttle guide means for providing straight-line motion accurately parallel with the longitudinal axis of the airgun.

18. A monoport airgun as claimed in claim 16, in which:

said elongated stationary bearing means has a stationary seal therein encircling said shuttle guide means;

said shuttle is in slidable sealing relationship with said stationary seal; and said stationary seal is located along said shuttle guide means in a position remaining in slidable sealing relationship with the shuttle with the shuttle is in its closed position and also in its open position.

* * * * *

UNITED STATES PATENT AND TRADEMARK OFFICE
CERTIFICATE OF CORRECTION

PATENT NO. : 5,315,917
DATED : May 31, 1994
INVENTOR(S) : Edward W. Mayzes

It is certified that error appears in the above-identified patent and that said Letters Patent is hereby corrected as shown below:

column 15, line 57, delete "monopot" and insert --monoport--;

column 15, line 64, delete "he" and insert --the--;

column 16, line 46, delete "monopot" and insert --monoport--;

column 17, line 11, delete "monopot" and insert --monoport--;

column 17, line 44, delete "monport" and insert --monoport--;

column 17, line 46, delete "or" and insert --for--;

column 18, line 1, delete "360+" and insert --360°--;

column 18, line 23, delete "monport" and insert --monoport--;

column 18, line 30, delete "internal" and insert --integral--;

column 18, line 34, delete "he" and insert --the--;

column 18, line 57, delete "with" second occurrence and insert --when--.

Signed and Sealed this

Twentieth Day of September, 1994

Attest:

BRUCE LEHMAN

Attesting Officer

Commissioner of Patents and Trademarks